UNITED STATES PATENT OFFICE

AUGUST ALBERT, OF HOCHST-ON-THE-MAIN, GERMANY, ASSIGNOR TO WINTHROP CHEMICAL COMPANY, OF NEW YORK, N. Y., A CORPORATION OF NEW YORK

ARSENOBENZENE AND PROCESS OF PREPARING IT

No Drawing. Application filed August 31, 1927, Serial No. 216,785, and in Germany September 6, 1926.

My present invention relates to arsenobenzenes and process of preparing them.

I have found that arsenobenzenes are obtained by reducing in an acid medium any aromatic arsenic compounds the arsenic atom of which may be trivalent or pentavalent, in a suitable dissolving or suspending agent by means of hypophosphorous acid or a salt thereof and sulfurous acid or a salt thereof, if required with addition of hydriodic acid or a salt thereof.

Also crystallized products may in this manner be obtained. Thus there could for instance be prepared crystallized parahydroxyarsenobenzene.

The quantitative proportions of hypophosphorous acid or of the salts thereof to the arsenic compounds may be largely varied in the said reaction without essentially influencing its course. The greater the quantity of the acid employed is, the more rapidly the reaction seems to proceed. There are used for instance on 1 mol of the arsenic compound about 5 mols of hypophosphorous acid.

The quantity of sulfurous acid plays, on the other hand, a decisive part in the reaction. A very small quantity thereof is sufficient for obtaining arsenobenzenes. I have used for instance about 1/40 mol of sulfurous acid calculated upon 1 mol of the arsenic compound. The quantity of sulfurous acid may be increased up to about 1/3 mol without the reaction being considerably altered thereby. When using for the reduction 1 mol or more of sulfurous acid calculated upon 1 mol of the arsenic compound, sulfur-containing products are obtained. These new arsenic compounds are probably sulfurized in the arsenic complex; most of them are soluble in ammonia in contrast to the arsenobenzenes and are as a rule entirely colorless. The said sulfur-containing compounds are intended to be used for therapeutical purposes or as starting materials for other substances of therapeutical action.

The following examples serve to illustrate my invention, but they are not intended to limit it thereto:—

1. The stock solutions may be prepared as follows:

I. One gram of sodium hypophosphite is dissolved in 10 ccm. of hot glacial acetic acid and allowed to cool.

II. An aqueous solution of sulfurous acid is prepared in such a strength that titration shows that 1 ccm. of the solution corresponds to 0,6 ccm. of a 1/1 normal caustic soda solution (indicator: methyl orange).

1,1 g. of the semicarbazone of 3-ω-carboxylic-methoxy-1-benzaldehyde-4-arsonic acid represented by the formula:

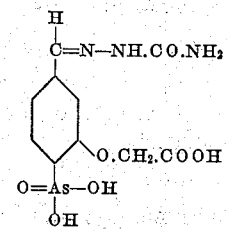

are dissolved in about 5,4 ccm. of a 1/1 normal aqueous solution of caustic soda and this solution is mixed with 9 ccm. of glacial acetic acid. To the clear solution thus obtained are added 8 ccm. of the stock solution I and 0,5 ccm. to 1 ccm. of the stock solution II previously diluted in the proportion 1:4. The mixture is heated until boiling sets in and kept at the boiling point for a very short time (about a quarter of a minute). This product is put on the water bath, whereupon the light-yellow arsenobenzene soon precipitates as very well developed tablets. The necessary quantity of sulfurous acid amounts in this case to about 1/40 mol calculated on 1 mol of the arsenic compound. It is not advantageous, when making experiments on a large scale, to increase considerably the quantity of the sulfurous acid to be used, because the acid becomes regenerated in the course of the process and crystallization is impeded when using large quantities of it. The mass is left on the water bath for about one hour. After having filtered the mass by suction, it is covered by pouring over it acetic acid of 50% strength and finally washed with water. There are obtained crystals, the color of which varies between yellow and dark-yellow and which are readily soluble in alkalis.

The formula of the arsenobenzene obtained in the above-described manner is as follows:

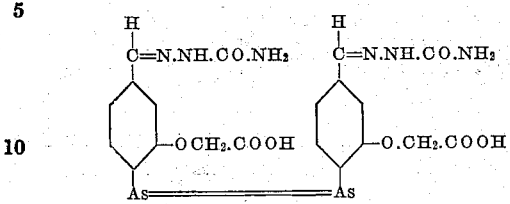

2. 1,2 g. of the semicarbazone of 3-hydroxy-1-benzaldehyde-4-arsonic acid of the following formula:

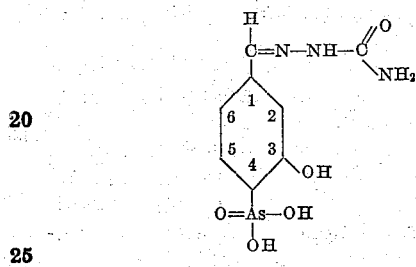

and 1,45 g. of the acetyl derivative of the foregoing compound having the formula:

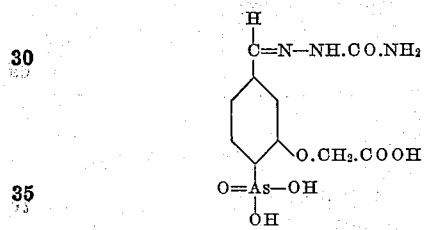

are dissolved in about 11 ccm. of normal caustic soda solution, and to this solution are added 36 ccm. of a solution of 5% strength of sodium hypophosphite in glacial acetic acid and then 3 ccm. of an aqueous solution of sulfurous acid (1 ccm.=0,6 to 0,7 ccm. of normal NaOH). The solution so prepared is heated for a short time over an open flame whereupon the arsenobenzene is precipitated in the form of light-yellow crystalline needles. The mass is left on the water bath for an hour, then it is filtered by suction at the boil and washed for a short time. The dry product decomposes at a temperature exceeding 200° C. It is readily soluble in dilute caustic soda solution at an entirely clear solution.

It has the following formula:

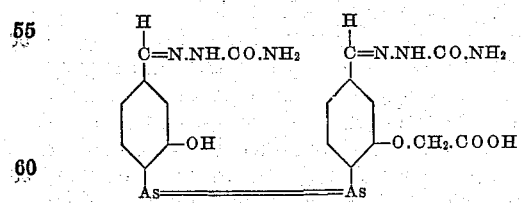

3. 0,6 g. of the semicarbazone of 1-benzaldehyde-3-hydroxy-4-arsonic acid are dissolved in 2,4 ccm. of normal caustic soda solution in a small pressure bottle, to this solution are added a solution of 1 g. of sodium hypophosphite in 20 ccm. of glacial acetic acid and then 0,5 ccm. of aqueous sulfurous acid (1 ccm.= 0,68 to 0,70 ccm. of normal NaOH). The reaction vessel is advantageously chosen in such a manner that the solution occupies, if possible, the whole vessel. The pressure bottle is then gradually heated in the water bath to a temperature of about 80° C. to 85° C. and maintained at this temperature for 15 to 30 minutes. There is at first a whitish turbidity which however, gradually gives way to a yellow precipitate which fills up the whole vessel in a voluminous state. After cooling, the mass is filtered by suction, washed with glacial acetic acid for a short time and dried in vacuo. The product crystallizes in the form of fine, long, yellowish needles decomposing at temperatures exceeding 240° C.

It has the following formula:

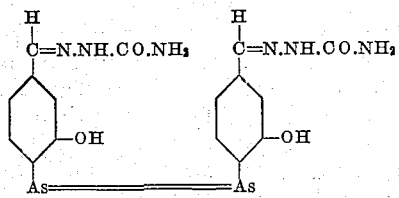

4. 0,3 g. of the semicarbazone of 1-acetophenone-3-hydroxy-4-arsonic oxide are suspended in a solution of sodium hypophosphite in glacial acetic acid 1:10 and to this suspension is added 0,5 to 1 ccm. of aqueous sulfurous acid (1 ccm.=0,68 to 0,70 ccm. of normal NaOH). The pressure bottle, which has been entirely filled up, if possible, with the suspension thus prepared, is shaken at ordinary temperature for several hours or heated for a short time to 70° C. The originally white suspension is transformed into an arsenobenzene crystallizing in the form of beautiful pointed needles. After having filtered the product by suction, it is washed with a small quantity of glacial acetic acid and finally with water. The arsenobenzene readily dissolves in dilute caustic soda solution and decomposes at about 230° C.

It has the following formula:

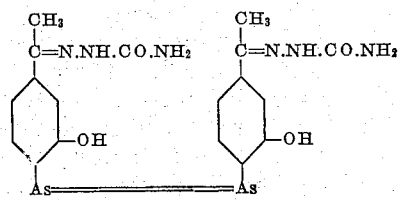

5. 0,6 g. of the semicarbazone of 1-benzaldehyde-3-hydroxy-4-arsonic acid are dissolved with about 2,4 ccm. of normal caustic soda solution in a small pressure bottle. This solution is mixed with a clear solution of 1 g. of sodium hypophosphite in 20 ccm. of glacial acetic acid. After having thoroughly shaken the mixture, there are added thereto immediately 6,6 ccm. of aqueous sulfurous acid. (The strength of the acid is determined by titration so that 1 ccm. of the acid corresponds to 0,68 to 0,70 ccm. of normal caustic soda solution, methylred or methylorange being used as indicator.) In the present example there is consequently employed 1 mol of $SO_2$ calculated upon 1 mol of the arsenic compound. When using 2 mols of $SO_2$ there is more advantageously employed a sulfurous acid of a correspondingly higher concentration. The reaction bottle is best chosen so large that the liquid occupies entirely, if possible, the volume of the bottle. The closed pressure bottle is put into a water bath which is slowly heated until there is attained a temperature of about 80° C. to 85° C. The reaction is allowed to proceed at the said temperature for about 15 to 30 minutes. There is obtained at first a whitish precipitate which gives way to a precipitate of a very feeble yellowish color. After cooling, the product is filtered by suction, washed with glacial acetic acid and with water and dried in a vacuum. It crystallizes in the form of colorless small tablets decomposing at about 225° C.

6. 6 g. of the semicarbazone of 1-aldehyde-3-hydroxy-4-arsonic acid are dissolved in 18 ccm. of an alcoholic 5 to 6 times normal hydrochloric acid, and to this solution which has been diluted with 30 ccm. of alcohol are added 12 ccm. of hypophosphorous acid of 50% strength and 0,4 ccm. of dilute hydriodic acid. (The hydriodic acid of the specific gravity of 1,7 is previously diluted with four times its quantity of alcohol.) Into the clear solution are introduced, drop by drop, while stirring and cooling with water, 15 ccm. of an ethyl alcoholic solution of $SO_2$ (1 ccm.=2,8 ccm. of NaOH). The interior temperature of the reaction liquid is 22° C. to 25° C. The solution of $SO_2$ is introduced in the course of about 20 minutes. The almost clear solution is then rapidly filtered several times, whereupon large, very beautiful, pronounced colorless tablets of crystals are precipitated after some time from the entirely clear filtrate. The well-closed vessel is then allowed to stand for about 24 hours and the considerable precipitate is filtered by suction. After washing it with some glacial acetic acid it is dried in a vacuum. The yield amounts to about 5,8 g. The product decomposes at about 225° C. and is readily soluble in an excess of ammonia.

7. To a hot solution of 20 g. of sodium hypophosphite in 400 ccm. of glacial acetic acid are added 10 g. of semicarbazone of 1-aldehyde-3-hydroxy-4-arsonic acid and 200 ccm. of aqueous sulfurous acid (1 ccm. of acid=1,5 ccm. of NaOH). The mixture is boiled in a reflux apparatus while vigorously shaking for about 6 minutes. The originally white suspension becomes yellow, thereupon there occurs for a short time solution and finally separation of a colorless product which, after cooling, is filtered by suction and washed with glacial acetic acid. The product crystallizes into tablets decomposing at about 230° C. 1 g. of this substance is dissolved in 12 ccm. of a normal sodium methylate solution, the undissolved sulfur is rapidly filtered off and then the separation of a sodium salt sets in, which is readily soluble in water to a clear solution.

8. 0,8 g. of 3-amino-4-hydroxy-1-arsonic acid is dissolved in 3 ccm. of alcoholic about 5 to 6 times normal hydrochloric acid and to this solution, which is diluted with 7 ccm. of alcohol, are added 2 ccm. of hypophosphorous acid of 50 per cent. strength and 0,07 ccm. of dilute hydriodic acid. 1 mol of sulfurous acid dissolved in alcohol is then introduced, drop by drop, into the mixture so prepared, as it is indicated in Example 6. The solution which is feebly turbid is filtered to a clear solution. On allowing the filtrate to stand for a prolonged time, colorless rectangular crystals precipitate therefrom which are filtered by suction, washed with glacial acetic acid and dried in a vacuum. When heated in a capillary tube, the product changes from 200° C. upwards and decomposes at about 230° C.

In the following claims the term "any arsenic compound of the benzene series" is intended to comprise such compounds in which the As is trivalent or pentavalent.

Furthermore I wish it to be understood that the process may also be carried out in the presence of a very small quantity of hydriodic acid.

I claim:

1. The process which comprises preparing arsenobenzenes by acid reduction of any arsenic compound of the benzene series by means of an excess of hypophosphorous acid and in the presence of sulfurous acid, the quantity of sulfurous acid amounting to at least 1/40 mol, calculated upon 1 mol of the arsenic compound.

2. The process which comprises preparing arsenobenzenes by acid reduction of any arsenic compound of the benzene series by means of an excess of hypophosphorous acid and in the presence of sulfurous acid, the quantity of sulfurous acid amounting to at least one mol calculated upon 1 mol of the arsenic compound.

3. The process which comprises preparing arsenobenzenes by acid reduction of any arsenic compound of the benzene series in the presence of glacial acetic acid by means of an excess of hypophosphorous acid and in the presence of sulfurous acid.

4. The process which comprises preparing arsenobenzenes by acid reduction of any arsenic compound of the benzene series in the presence of glacial acetic acid by means of an excess of hypophosphorous acid and in the presence of sulfurous acid, the quantity of sulfurous acid amounting to at least 1/40 mol, calculated upon 1 mol of the arsenic compound.

5. The process which comprises preparing arsenobenzenes by acid reduction of any arsenic compound of the benzene series in the presence of glacial acetic acid by means of an excess of hypophosphorous acid and in the presence of sulfurous acid, the quantity of sulfurous acid amounting to at least 1 mol, calculated upon 1 mol of the arsenic compound.

6. The process which comprises preparing arsenonbenzenes by acid reduction of an arsonic acid of the benzene series by means of an excess of hypophosphorous acid and in the presence of sulfurous acid, the quantity of sulfurous acid amounting to at least 1/40 mol, calculated upon 1 mol of the arsenic compound.

7. The process which comprises preparing arsenobenzenes by acid reduction of an arsonic acid of the benzene series by means of an excess of hypophosphorous acid and in the presence of sulfurous acid, the quantity of sulfurous acid amounting to at least 1 mol, calculated upon 1 mol of the arsenic compound.

8. The process which comprises preparing arsenobenzenes by acid reduction of an arsonic acid of the benzene series in the presence of glacial acetic acid by means of an excess of hypophosphorous acid and in the presence of sulfurous acid.

9. The process which comprises preparing arsenobenzenes by acid reduction of an arsonic acid of the benzene series in the presence of glacial acetic acid by means of an excess of hypophosphorous acid and in the presence of sulfurous acid, the quantity of sulfurous acid amounting to at least 1/40 mol, calculated upon 1 mol of the arsenic compound.

10. The process which comprises preparing arsenobenzenes by acid reduction of an arsonic acid of the benzene series in the presence of glacial acetic acid by means of an excess of hypophosphorous acid and in the presence of sulfurous acid, the quantity of sulfurous acid amounting to at least 1 mol, calculated upon 1 mol of the arsenic compound.

11. The process which comprises preparing arsenobenzenes by acid reduction at 80° C. to 85° C. of the semicarbazone of 1-benzaldehyde-3-hydroxy-4-arsonic acid dissolved in normal caustic soda solution in the presence of glacial acetic acid by means of an excess of hypophosphorous acid and sulfurous acid, the quantity of sulfurous acid amounting to at least 1/40 mol, calculated upon 1 mol of the arsenic compound.

12. The process which comprises preparing arsenobenzenes by acid reduction at 80° C. to 85° C. of the semicarbazone of 1-benzaldehyde-3-hydroxy-4-arsonic acid dissolved in normal caustic soda solution in the presence of glacial acetic acid by means of about 5 to 6 mols of hypophosphorous acid and 1 mol of sulfurous acid, calculated upon 1 mol of the arsenic compound.

13. As new products, sulfur-containing aromatic arseno compounds substantially identical with compounds obtainable by acid reduction of any arsenic compound of the benzene series by means of an excess of hypophosphorous acid and sulfurous acid, the quantity of sulfurous acid amounting to at least one mol, calculated upon 1 mol of the arsenic compound, the said new compounds being products of therapeutical value, as a rule colorless and mostly soluble in ammonia.

14. As a new product, a sulfur-containing arseno compound substantially identical with the compound obtainable by acid reduction at 80° C. to 85° C. of the semicarbazone of 1-benzaldehyde-3-hydroxy-4-arsonic acid in the presence of glacial acetic acid by means of about 5 to 6 mols of hypophosphorous acid and 1 mol of sulfurous acid calculated upon 1 mol of the arsenic compound, the said sulfur-containing arseno compound being a colorless product of therapeutical value, crystallizing as small tablets which decompose at 225° C.

In testimony whereof, I affix my signature.

AUGUST ALBERT.